United States Patent [19]

Morriss et al.

[11] 4,047,970
[45] Sept. 13, 1977

[54] PRODUCTION OF CALCINED CERAMIC PIGMENTS

[75] Inventors: Harry Augustus Morriss, Wombourne; John Peter Hugh Williamson, Chester, both of England

[73] Assignee: Keeling and Walker, Limited, Stoke-on-Trent, England

[21] Appl. No.: 711,935

[22] Filed: Aug. 5, 1976

Related U.S. Application Data

[63] Continuation-in-part of Ser. No. 544,452, Jan. 27, 1975, abandoned.

[51] Int. Cl.² ............................................... C09C 1/00
[52] U.S. Cl. .................................................... 106/299
[58] Field of Search .......................................... 106/299

[56] References Cited

U.S. PATENT DOCUMENTS

| | | | |
|---|---|---|---|
| 2,438,335 | 3/1948 | Earl | 106/299 X |
| 3,058,838 | 10/1962 | Olby | 106/299 |
| 3,171,753 | 3/1965 | Olby | 106/299 |
| 3,189,475 | 6/1965 | Marquis et al. | 106/299 |
| 3,257,221 | 6/1966 | Olby | 106/299 |
| 3,514,303 | 5/1970 | Meyer-Simon et al. | 106/299 |
| 3,573,080 | 3/1971 | Bell et al. | 106/299 |
| 3,749,763 | 7/1973 | Scammon, Jr. et al. | 423/76 X |
| 3,811,907 | 5/1974 | Scammon, Jr. et al. | 106/299 |

*Primary Examiner*—Patrick P. Garvin
*Assistant Examiner*—William G. Wright
*Attorney, Agent, or Firm*—Dowell & Dowell

[57] ABSTRACT

The process for producing zirconium based pigments (also known as stains) comprises the direct use of plasma disassociated zirconium sand. The sand is comminuted to a suitable particle size, mixed with a color determining agent such as ammonium metavanadate and a mineralizer such as sodium fluoride, after which the resulting mixture is calcined to bring about a reaction between the zirconium sand and the color determining agent to produce the required pigments. The resulting calcined pigment is then ground to a suitable particle size ready for application to ceramic tiles.

22 Claims, 5 Drawing Figures

PRODUCTION OF CALCINED CERAMIC PIGMENTS

BACKGROUND TO THE INVENTION

This is a continuation-in-part of U.S. Patent application Ser. No. 544,452 filed on Jan. 27, 1975 and now abandoned, and relates to a process for the production of zircon based pigments (also known as stains) particularly but not solely for use in colouring ceramic articles, e.g. ceramic tiles.

The use of such stains for ceramics is well established in industry. The first zircon stains were zirconium-vanadium blue pigments and examples of the preparation of this stain and several variants of it are described in the paper by F. T. Booth and G. N. Peel, Trans, Brit. Ceram. Soc. 61, 359–400 (July 1962). The first yellow pigments included sodium molybdate and praseodymium oxide in a zirconia/silica mix, as described by E. Kato, Keram, Zeitschrift, 13, (1961) 128–130; but it is more common practice at this time for praseodymium oxide or oxalate only to be used, for example British Pat. Nos. 965,863 and 895,569. Examples of other zirconium stains having an iron colouring agent, usually either ferrous sulphate, hydrated ferric chloride, or iron oxide, which produce a coral-pink colour, are described in the specifications of British Pat. Nos. 986,751 and 996,033, U.S. Pat. No. 3,189,475 and in German Pat. Nos. 1,163,222 and 1,204,996.

The factor common to all stains of the types indicated is that a mixture of zirconia and silica with the colour producing agent is converted by a calcination stage to a form of zirconium silicate which is coloured by virtue of the fact that the colour determining agent or a transient compound or ion derived therefrom is entrapped within, or in some cases around, the growing zircon lattice.

The normally accepted method of producing such a zirconia/silica based stain is to calcine a mixture of zirconium oxide and silica in a weight ratio of about two to one, i.e. approximately equimolecular proportions, together with the colour determining agent, and a catalyst (the "mineraliser"). The usual colour determining agents are vanadium (as ammonium metavanadate) for the blue; praseodymium (as oxide, carbonate or oxalate) for the yellow; and iron (as oxide or sulphate) for the pink. Common mineralisers, whose function it is to reduce the temperature required for the reaction or to catalyse the reaction itself, include the alkali metal halides, especially fluorides. After calcination, the product is ground, washed free of soluble salts, dried and pulverised.

An alternative method as described for instance in British Patent specification No. 1,177,676 is based upon the direct reaction or "cracking" of the zirconium-bearing ore, zircon sand (zirconium silicate), with sufficient alkali to convert the zirconium silicate to a non-refractory form (in which the zirconium constituent is in the form of sodium zirconate) by heating together at a temperature in excess of 800° C. The converted product is then mixed with water to decompose the sodium zirconate, and a colour determining agent, sulphuric acid, and a mineraliser are added. This mixture is dehydrated and the calcined, ground, washed, and dried in the usual way. A variation of this process using ammonium sulphate instead of sulphuric acid has been reported. Further descriptions of processes of these kinds are given in French Pat. No. 1,427,877, West German Pat. No. 1,242,500, and Belgian Pat. No. 695,602. It is a disadvantage of methods such as these that the yields of calcined stains are low after extraction of by-products and that the colour makers' kiln capacity is unprofitably occupied. In addition, it has been found in practice that the stains obtained are highly variable in shade and strength.

SUMMARY OF THE INVENTION

According to the present invention we provide a process for the production of a zircon based stain by reacting a zirconia containing material with a colour determining agent, the improvement comprising reacting a zirconia containing material which is a comminuted plasma-dissociated zircon sand having a zirconia rich phase, a silica rich phase and not more than 30% unreacted zircon sand, with a colour determining agent, wherein said comminuted plasma dissociated zircon sand contains an amount of silica in its original chemical form ($SiO_2$) which is at least 90% by weight of its silica content prior to comminution.

Preferably the zircon sand is first comminuted and calcined together with the colour determining agent and a mineraliser.

The plasma dissociated zircon for the purpose of the present invention means zircon that has been subjected in particulate form through a zone of heat sufficient to raise the temperature of the particles to form them into material having a zirconia-rich phase and a silica rich phase, and containing not more than 30% of undissociated zircon.

The plasma dissociated zircon used in the present invention is produced by treatment of the zircon sand in a plasma generator which is a device for heating gases or solids with an electric arc. It has been observed by Charles et al, (Mining & Metall. Trans. 79C 54-59 1970) that zircon if so heated to a sufficiently high temperature dissociates into a zirconia rich phase and a silica rich phase. It is a characteristic of the equipment now being utilised (and described in British Patent specification No. 1,248,595 Ionarc Smelters Limited and U.S. Pat. Nos. 3,749,763 and 3,811,907) that the method produces a zirconia rich phase containing substantially less than 0.5% silica, and a silica rich phase correspondingly low in zirconia. This very efficient dissociation is thought to result from the combination of ultra-high temperature and rapid quench to which the zircon particles are subjected in the arc. A furnace of Ionarc design operates at 300–400 kW and has a throughput of 300–600 lbs/hour.

The processed product has a somewhat lower melting point and lower specific gravity (3.5 to 4.0) than normal zircon and consists essentially of intimate mixtures of zirconia in the form of radially orientated crystals (shown diagrammatically as A in FIG. 1) in a matrix of silica (shown as B in FIG. 1). Optical examination of the dissociated product shows that three main categories of material are present: Type I, the unreacted grains of zircon; Type II, the angular grains of partially dissociated material; Type III, fully fused, fully dissociated particles usually spherical in form.

Figure 1:
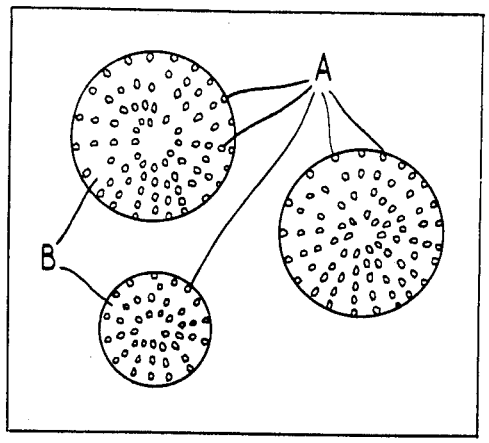
FIG. 1 represents diagrammatically the fine structure of a fully fused dissociated zircon spheroid. The zirconia Microlites are on average only 0.1–0.2 microns in cross-section, although they may be many microns long, whilst the spheroids themselves will vary from 50 microns to 250 microns in diameter.
Figure 2:
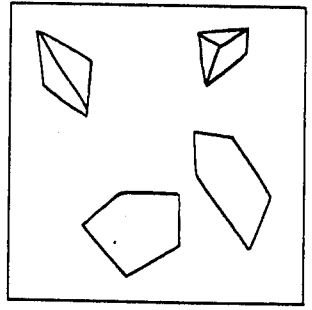
FIG. 2 is a microscopic representation of the product showing the typical unreacted grains of zircon (Type I)
Figure 3:
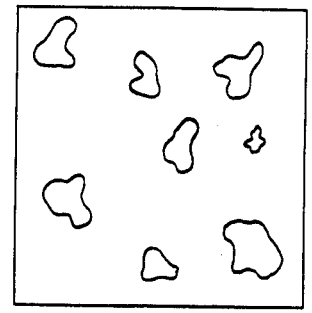
FIG. 3 shows partially dissociated zircon grains (Type II). Note that Types I and II are not normally readily distinguishable by the outline shape of the particles —0 a more convenient means of distinguishing the two is the brown colouration characteristic of Type II and due to the separated zirconia visible in an optical microscope with plane polarised light.
Figure 4:
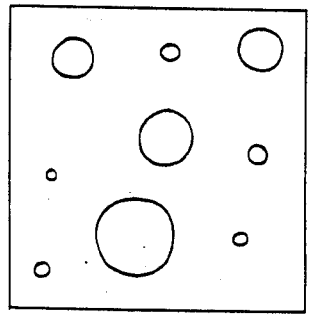
FIG. 4 shows fully fused, fully dissociated grains (Type III). These grains are generally porous and have an average specific gravity of approximately 3.5.
Figure 5:
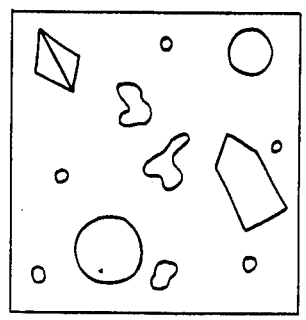
FIG. 5 represents the appearance of the product from the torch itself.

The proportions of the particles of the Type I, II and III are dependent upon the rate of throughput of the zircon sand through the arc and upon the power applied. If the throughput is sufficiently slow, then the dissociated zircon will be predominantly of Type III. At relatively faster throughputs the particles of dissociated zircon will include more appreciable proportions of the Type I and II varieties. As a general rule, representatives of all three types will be found in any dissociated zircon.

DESCRIPTION OF PREFERRED EMBODIMENTS

Dissociated zircons of Type II and III are both suitable for the direct production of ceramic colours although the yield of the very high strength colours now possible will depend on there being a suitable low proportion, i.e. no more than 2% by weight of the whole, of Type I (the relatively unaffected zircon grains). Whilst the Type III dissociated zircon will give best results, the Type II material, characteristic of processing at a faster rate, can also be used in the present invention. It should be emphasized that Type II contains a proportion as a central kernel of undissociated zircon, dependent on the rate of throughput and the constitution f the starting zircon sand. However, the greater the proportion of fully dissociated material, the stonger the colours which can ultimately be produced from the comminuted dissociated zircon, hereinafter referred to as DZ.

A mineraliser is added to the mixture of milled DZ and the colour determining agent to reduce the temperature of the calcination reaction in the normal way. The plasma dissociated zircon sand may be comminuted to a suitable size by dry milling. Preferably the plasma dissociated sand suitable for producing zircon based stains has a particle size of 150 to 350 mesh (British Standard) for the vanadium blue, less than 350 mesh for the yellow. However, more advantageously a wet milling process is used in which the dissociated zircon may be wet milled in the presence of additives which attack the surface of the silica constituent in the dissociated zircon. Additives which may be used include: caustic soda, caustic potash, hydrofluoric acid, sodium, potassium or ammonium bifluorides, alkaline sodium silicates, alkali metal fluorides in the presence of hydrofluoric acid. Concentrations of additive of up to 10% effective agent relative to the DZ (dissociated zircon) may be used, but the optimum, in terms of the final colour which can be produced, is usually 1–3%. The amount of water which may be added is between 5 and 25% relative to the DZ but best results will normally be obtained between 15 and 20%. The use of a fluoride as the additive has the added advantage that the fluoride also acts as a mineraliser, thus the products of the wet milling process may be "self fluxing" and there may be no necessity to add another mineraliser prior to calcining as in conventional methods.

According to one embodiment of the present invention, when wet milling the colour determining agent is ammonium metavanadate, with a phosphorous containing compound included in the mineraliser composition.

The phosphorous containing compound may be a phosphate such as sodium triphosphate, a monofluorophosphate such as sodium monofluorophosphate, a phosphorous ester such as trixylyl phosphate or a polyphosphate such as sodium tripolyphosphate.

In all cases, the fully inorganic phosphates are the most effective, and features common to all the reactions are:
  i. a change in shade from the greenish blue of the basic formulations without phosphate to a more reddish tone at phosphate radical levels of about 0.1%,
  ii. a change in colour from blue to a blue/violet or grey/violet at phosphate radical levels of about 1% in the case of dry milled dissociated zircon but not wet milled,
  iii. extensive bleaching of the colour at phosphate radical levels about and in excess of 2% particularly in the case of the wet milled DZ.

DESCRIPTION OF SPECIFIC EXAMPLES

The wet milling process may be carried out as described in the following Examples 1 and 2:

EXAMPLE 1

900 Pounds of 1½–2 inch high density alumina balls are charged to a 3 foot 6 inch ball mill with 450 pounds of dissociated zircon, 9 pounds of caustic soda flake and 75 pounds of water. After milling for 20–30 hours or until 99% is less than 200 mesh, the charge is neutralised with hydrochloric acid (27 lbs) or sulphuric acid. The slurry is dumped from the mill, spray dried or dried by any other convenient means, and the particle size of the powder product determined (say 3–12 microns on the Fisher Sub-Sieve Sizer).

EXAMPLE 2

This alternative method would use with 450 pounds of DZ 1% of sodium fluoride (4½ pounds) and ½% hydrofluoric acid (4 pounds of 60% HF acid) by weight relative to the DZ. After milling for 15–30 hours or until 99% is less than 200 mesh, the charge is neutralised with caustic soda. The particles size will be 3–12 microns (Fisher). The slurry is then dumped and dried. Alternatively, the charge is neutralised after dumping but before drying.

It is further feasible and occasionally advantageous to neutralise the charge at any time during the course of the milling process.

In both Examples 1 and 2, the dried product contains all of the original silicon content and at least 90% of it is still in its original chemical condition ($SiO_2$), only a very small amount being converted to sodium silicate or other compounds. Some or all of the silicate or other compounds could be removed if desired before drying.

For wet milling the additive or total of the additives for attacking the surface of the silica may be 0.5 to 10% by weight of the zircon sand. Thus, only the surface of the silica is attacked and a maximum quantity of the silica converted to silicate or other compounds will be less than 10% by weight of the initial weight of the silica. By this means the zircon grains can then be comminuted.

It is also possible to wash out all water soluble materials before drying — but in the case of the "fluoride attack" (Example 2 above) some loss of zirconium values will result. In the case of the "caustic attack" (Example 1 above) the strength of the colours which can be produced with the comminuted product will then be somewhat impaired.

The following Examples 3 to 8 describe colour formulations which can be produced in this manner.

In the Examples which follow, the milled product is referred to as DIZIRC which is a trade mark of Keeling & Walker Limited (No. 1,027,872). Unless otherwise stated all percentages and parts referred to herein are by weight.

EXAMPLE 3

| DIZIRC from 1 above at 7 microns (Fisher) | | 90 parts |
|---|---|---|
| silica (quartz) | | 10 parts |
| ammonium metavanadate | 5–8 e.g. | 6 parts |
| sodium fluoride | 3–7 e.g. | 6 parts |

Calcine at 650°–900° C, grind as required, wash, dry, pulverise the resulting blue pigment.

EXAMPLE 4

| DIZIRC from 2 above at 7 microns (Fisher) | | 90 parts |
|---|---|---|
| silica (quartz) | | 10 parts |
| ammonium metavanadate | 5 – 8 e.g. | 6 parts |
| sodium fluoride | 3 – 7 e.g. | 6 parts |
| sodium chloride | 2 – 7 e.g. | 5 parts |

Calcine at 650°–900° C, grind as required, wash, dry, pulverise the resulting blue pigment.

EXAMPLE 5

| DIZIRC from 1 above at 7 microns (Fisher) | | 90 parts |
|---|---|---|
| silica (quartz) | | 10 parts |
| praseodymium oxide | 2 – 5 e.g. | 4 parts |
| sodium fluoride | 1 – 7 e.g. | 6 parts |

Calcine at 800°–1,000° C, grind as required, wash, dry, pulverise the resulting yellow pigment.

EXAMPLE 6

| DIZIRC from 2 above at 7 microns (Fisher) | | 90 parts |
|---|---|---|
| silica (quartz) | | 10 parts |
| praseodymium oxide | 2 – 5 e.g. | 4 parts |
| sodium fluoride | 1 – 7 e.g. | 5 parts |
| sodium chloride | 1 – 7 e.g. | 5 parts |

Calcine at 800°–1,000° C, grind as required, wash, dry pulverise the resulting yellow pigment.

EXAMPLE 7

| DIZIRC | | 90 parts |
|---|---|---|
| silica (quartz) | 0–10 e.g. | 5 parts |
| iron sulphate | 25–70 e.g. | 40 parts |
| sodium fluoride | 10–20 e.g. | 15 parts |
| sodium chloride | 5–15 e.g. | 10 parts |
| sodium potassium nitrate | 5–15 e.g. | 10 parts |

Calcine at 850°–1,000° C, grind as required, wash, dry, pulverise the resulting peach pigment.

EXAMPLE 8

| DIZIRC | | 90 parts |
|---|---|---|
| silica (quartz) | | 10 parts |
| red iron oxide | 5–23 e.g. | 15 parts |
| sodium fluoride | 5–15 e.g. | 10 parts |

Calcine at 850°–1,000° C, grind as required, wash, dry, pulverise the resulting peach pigment.

The procedure for preparing a DIZIRC product on a pilot plant scale is described above; but alternatively the dissociated zircon can be comminuted in situ with or without the other components of the colour formulation. However, in these latter cases, care must be taken to ensure that there is no loss of water-soluble constituents and allowance made for the fact that, with the high proportion of other materials, the particle size of the dissociated zircon cannot be so conveniently controlled.

The following Example 9 described the method of dry milling with subsequent fractionation.

EXAMPLE 9

The process may be carried as follows in the laboratory:

6 kilos of ½ inch cylinder zircon grinding media are charged to a 1 gallon porcelain ball mill and 1,000 gm. of dissociated zircon added. After dry milling for several hours until 98% is less than 150 mesh (BS) the extracted material is separated first through a 150 mesh sieve then through a 325–350 mesh sieve to give two fractions. The finer of the two is used to produce the yellow pigment, the coarser the blue.

The following Examples 10 to 17 describe colour formulations which can be produced using DIZIRC produced by the dry milling process of Example 9.

EXAMPLE 10

| DIZIRC | 100 parts by weight of material passing a mesh size of 200 (British Standard) but standing on 325 mesh |
|---|---|
| ammonium metavanadate | 5–10 parts e.g. 8 |
| sodium fluoride | 3–7 parts e.g. 6 |
| sodium chloride | 3–7 parts e.g. 6 |

Calcine at 700°–900° C, grind as required, wash, dry, pulverise the resulting blue pigment. The pigment produced is comparable in intensity with the earlier commercial zirconium vanadium blues.

EXAMPLE 11

| DIZIRC | 100 parts by weight of material passing a mesh size of 200 (British Standard) but standing on 325 mesh |
|---|---|
| ammonium metavanadate | 5–10 parts e.g. 8 |
| silica (quartz) | 0–10 parts e.g. 8 |
| sodium or potassium silicofluoride | 1–7 parts e.g. 5 |
| sodium chloride | 5–10 parts e.g. 6 |
| potassium nitrate | 1–7 parts e.g. 5 |

Calcine at 680°–900° C, grind as required, wash, dry, pulverise the resulting blue pigment. Formulations of this type produce higher strength stains than can be obtained with Example 9.

EXAMPLE 12

| DIZIRC | 100 parts by weight of material passing a mesh size of 325 (British Standard) |
|---|---|
| praseodymium oxide | 2-5 parts e.g. 4 |
| sodium fluoride | 3-6 parts e.g. 4 |
| sodium chloride | 3-6 parts e.g. 4 |

Calcine at 850°-1,000° C, grind as required, wash, dry, pulverise the resulting yellow pigment.

EXAMPLE 13

| DIZIRC | 100 parts by weight of material passing a mesh size of 325 (British Standard) |
|---|---|
| praseodymium oxide | 2-5 parts e.g. 4 |
| silica (quartz) | 0-10 parts e.g. 6 |
| barium silicofluoride | 1-5 parts e.g. 4 |
| sodium chloride | 3-20 parts e.g. 10 |

Calcine at 850°-1,000° C, grind as required, wash, dry, pulverise the resulting yellow pigment. Formulations of this type produce higher strength stains than can be obtained with Example 11.

EXAMPLE 14

| DIZIRC | 100 parts by weight of material passing a mesh size of 325 (British Standard) |
|---|---|
| iron sulphate | 25-70 parts e.g. 40 |
| sodium fluoride | 10-20 parts e.g. 15 |
| sodium chloride | 5-15 parts e.g. 10 |
| sodium or potassium nitrate | 5-15 parts e.g. 10 |

Calcine at 800°-1,000° C, grind as required, wash, dry, pulverise the resulting pink pigment.

The procedure for preparing, in the laboratory, the appropriate DIZIRC fractions is described above; but alternatively the dissociated zircon can be comminuted in situ with or without the other components. However, these latter methods result in a reduction in the final colour strength of the stain produced since the particle size of the dissociated zircon can not be so conveniently controlled.

Examples 15 and 16 illustrate the use of a phosphorous containing compound as a component of the mineraliser for the purpose of modifying the shade of the basic blue stain.

Example 15

| DIZIRC | 100 parts by weight of material passing a mesh size of 200 (British Standard) but standing on 325 mesh |
|---|---|
| ammonium metavanadate | 5-10 parts e.g. 6 |
| sodium fluoride | 3-7 parts e.g. 5 |
| sodium chloride | 3-7 parts e.g. 5 |
| sodium monofluorophosphate | 0.1-4 parts e.g. 2 |

Calcine at 700°-900° C, wash, dry, pulverise the resulting blue to blue/violet pigment, grind as necessary.

Example 16

| DIZIRC | 100 parts by weight of material passing a mesh size of 200 (British Standard) standing on 325 mesh |
|---|---|
| ammonium metavanadate | 5-10 parts e.g. 8 |
| sodium or potassium silicofluoride | 1-7 parts e.g. 5 |
| sodium chloride | 5-10 parts e.g. 6 |
| trisodium phoshpate | 1-7 parts e.g. 5 |

Calcine at 700°-900° C, wash, dry, pulverise the resulting blue to blue/violet pigment, grind as necessary.

The following Example 17 illustrates the use of a lead compound as a component of the mineraliser.

Example 17

| DIZIRC | 100 parts |
|---|---|
| praseodymium oxide | 2-5 parts e.g. 4 |
| sodium fluoride | 3-7 parts e.g. 4 |
| sodium chloride | 3-7 parts e.g. 4 |
| and red lead | 1-10 parts e.g. 6 |
| or lead bisilicate | 1-10 parts e.g. 6 |

Calcine the mixture at 850°-1,000° C, wash, dry, and pulverise the resulting yellow pigment. The pigment is thereafter milled to the required particle size.

The process of fractionation subsequent to milling may be omitted, but the colours then produced will be weaker. In all cases the use of a silicofluoride in the mineraliser formulation is advantageous.

We have also discovered that it is possible to induce a degree of chemical milling in what are, in practical terms, damp conditions by milling with an appropriate additive in the presence of between 2 and 5% of moisture (relative to the DZ in the mill).

Example 18

This process may be carried out in the laboratory as follows: 6 Kilos of ¾ inch alumina milling media are charged to a 1 gallon porcelain ball mill and 600 gms of DZ added, together with 12 gm caustic soda flake and 12 gms of water. After milling for several hours until 95% is less than 200 mesh, the extracted material is used directly in formulations such as given in Examples 3, 10, 12 and 13.

It is to be noted that we have discovered that comminuted dissociated zircon is suitable for the direct preparation of pigments so obviating the necessity as in the prior art, to prepare an intimate mixture of (fully separated) zirconia and silica in a 2:1 ratio since this proportion of a substantially similar or suitable ratio already exists in the dissociated zircon. Whereas the Ionarc process is used for dissociating zircon from which zirconium oxide is produced by first leaching out substantially all of the silica (ref: Ravinder & Wilks, "The commercial production of submicron $ZrO_2$ via plasma," A. I. Ch. E. Dec. 2, 1971), it is now not necessary to take this latter step.

Furthermore, we have discovered that for the present purposes the zircon can be dissociated at higher rates of throughput than those necessary to produce the fully leached oxide provided that the product does not contain more than 15% of the unreacted grains of zircon (Type I) and between 2 and 35% of Type II i.e. not more than say 30% of unreacted zircon in total.

The economic advantage of the present invention results from the possibility of using milled plasma dissociated zircon for the production of ceramic colouring materials comparable to the usual commercial yellow, blue and pink shades without incurring the costs of producing the zirconium oxide values by the normal methods of leaching or extraction and precipitation.

By normal leaching we mean removal of silica as far as practicable from the Zircon sand — at least 90% of the silica, and generally much more is converted into a different compound which is removed from the product.

For the purpose of this invention we take care to remove as little as possible of the silica. The small addition of silica attacking agent during wet or damp grinding is only sufficient to attack the surface of the silica. The temperature of the wet grinding will usually be normal grinding process temperature, and in any event below 150° F. The proportion of silica attacking agent added whether in wet or damp milling will be less than 0.5% of the stoichiometric amount required to convert all the silica to corresponding alkali metal silicate. We retain at least 90% of the silica originally present in the dissociated zircon sand in its original chemical form ($SiO_2$) for inclusion in the final stain. The comminuted DZ added to the ingredients for calcining into the stain contains at least 25% silica by weight of the zircon. The quantity of silica attacking agent used during milling is in any case less than 10% by weight of the zircon.

The amount of silica added with the colouring agent for calcination is always less than 15% by weight of the DZ. We have found that the addition of silica (quartz) improves the colour strength of the stain.

When calcining the DZ with the colouring agent, we may add one or more alkali metal salts, e.g. sodium fluoride, sodium chloride and sodium potassium nitrate preferably totalling 1 to 35 parts to 90 parts DZ.

The DZ mixed with the colour agent for calcining is in fused amorphous condition whereas it is to be noted that heretofore manufacturers of stains would not be use amorphous silica in making stains.

To summarise, the following main advantages are achieved by our process:

a. Facilitation of pigment manufacture in good yields by using a ready-made mixture of zirconia and silica in highly reactive forms, b. cost reduction arising from a most economical use of expensive raw materials, c. higher yields and elimination of a calcination in a colour makers' kiln when compared with "chemical crack" processes, d. colour strength pigments comparable to that which may be produced from high quality chemically precipitated oxides, e. good stability in colour shade from batch to batch provided the DIZIRC material is produced from fully dissociated zircon sand and provided also the characteristics of the comminution process are maintained constant, f. the production of "self-fluxing" DIZIRC products by wet milling dissociated zircon in the presence of additives which attack the silica constituent and which are mineralisers in the subsequent colour forming reactions, g. the production of hitherto unavailable grey violet stains — at reasonable cost — from dry milled DIZIRC.

We claim:

1. In the process for the production of a zircon based stain by reacting a zirconia containing material with a color determining agent the improvement comprising the steps of:
   a. plasma dissociating a zircon sand to obtain a plasma-dissociated zircon sand having zirconia rich phase, a silica rich phase and no more than 30% unreacted zircon sand;
   2. comminuting said plasma dissociated zircon sand without prior leaching to obtain a comminuted plasma dissociated zircon sand containing at least 90% by weight of its original silica content before comminution; and
   3. reacting said comminuted plasma dissociated zircon sand with a color determing agent.

2. In the process for the production of a zircon based stain by reacting a zirconia containing material with a color determining agent the improvement comprising the steps of:
   1. plasma dissociating a zircon sand to obtain a plasma dissociated zircon sand having a zirconia rich phase, a silica rich phase and no more than 30% unreacted zircon sand;
   2. comminuting said plasma dissociated zircon sand without prior leaching to obtain a comminuted plasma dissociated sand containing at least 90% by weight of its original silica content before comminution, by milling;
   3. mixing said comminuted zircon sand with a color determining agent and a mineralizer in the absence of any silica other than that contained in said comminuted zircon sand; and
   4. reacting said mixture comminuted zircon sand with said color determing agent and said mineralizer.

3. In the process for the production of a zircon based stain by reacting a zirconia containing material with a color determining agent the improvement comprising the steps of:
   1. plasma dissociating a zircon sand to obtain a plasma dissociated zircon sand having a zirconia rich phase, a silica rich phase and no more than 30% unreacted zircon sand;
   2. comminuting said plasma dissociated zircon sand by wet milling and drying without prior leaching to obtain a comminuted plasma dissociated zircon sand containing at least 90% by weight of its original silica content before comminution, said wet milling being effected in the presence of water and a silica attacking agent which attacks only the surface of the silica leaving most of the silica in its chemical condition prior to comminution; and
   3. reacting said comminuted zircon sand with a color determing agent.

4. The process according to claim 1, wherein the plasma dissociated zircon sand and colour determining agent are reacted together with an additional amount of silica (quartz) not exceeding 15% by weight of the plasma dissociated zircon sand.

5. A process according to claim 2, wherein the milling is carried out in the presence of water and an additive which reacts with the silica constituant of the zircon sand to a small extent while retaining at least 90% by weight of the silica.

6. The process for the production of a zircon based stain according to claim 1, wherein the plasma dissociated zircon sand is first comminuted and then mixed with a colour determining agent and a mineraliser and the mixture subsequently calcined.

7. A process for the production of a zircon based stain according to claim 1, wherein the plasma dissociated zircon sand is first mixed with a colour determining agent and a mineraliser and the mixture subsequently comminuted and calcined.

8. A process according to claim 5, wherein the additive is selected from: caustic soda, caustic potash, hydrofluoric acid, sodium, potassium or ammonium bifluoride, alkaline sodium silicate, ammonium fluoride or an alkali metal fluoride in the presence of hydrofluoric acid.

9. A process according to claim 2, wherein the colour determining agent is selected from iron sulphate, red iron oxide, praseodymium oxide, praseodymium oxalate, praseodymium carbonate, vanadium pentoxide, ammonium metavanadate, sodium ammonium vanadate, or such a vanadium compound together with a phosphate compound.

10. A process according to claim 9, wherein the phosphate compound is selected from: sodium triphosphate, sodium monofluorophosphate, trixylyl phosphate, sodium polyphosphate, and mixtures thereof.

11. A process according to claim 1, wherein the plasma dissociated zircon sand is comminuted by dry milling.

12. A process according to claim 11, wherein the dry milled plasma dissociated zircon sand is separated into a size fraction more appropriate for the colour of the desired stain before calcination when the colour determining agent and the mineraliser.

13. A process according to claim 12, wherein the colour determining agent is selected from iron sulphate, red iron oxide, praseodymium oxide, praseodymium oxalate, praseodymium carbonate, vanadium pentoxide, ammonium metavanadate, sodium ammonium vanadate.

14. A process according to claim 13, wherein the colour determining agent is ammonium metavanadate and a phosphate compound selected from: sodium triphosphate, sodium monofluorophosphate, sodium polyphosphate, trixylyl phosphate and mixtures thereof.

15. A process according to claim 13, wherein the colour determining agent is praseodymium oxide or oxalate or carbonate and the mineraliser contains a lead compound selected from red lead, lead bisilicate and mixtures thereof.

16. A process according to claim 1, wherein the plasma dissociated zircon sand is formed in a plasma arc operating with a D.C. energy level input of between 0.4 and 2.0 kWhr/lb.

17. A process according to claim 1, wherein the plasma dissociated zircon is formed in a plasma arc operating with an A.C. energy level input of between 0.4 and 4.0 kWhr/lb.

18. A process according to claim 1, wherein the plasma dissociated zircon sand has an average specific gravity of between 3.5 and 4.0.

19. A process according to claim 18, wherein the plasma dissociated zircon sand consists of 50 to 98% fully fused particles of dissociated zircon, 2 to 35% partially dissociated particles, and up to 15% undissociated grains.

20. A process for the production of a zircon based stain according to claim 1, wherein the plasma dissociated zircon sand is first comminuted to a particle size of from 150 to 350 mesh (British Standard) and then mixed with a colour determining agent and a mineraliser and the mixture subsequently calcined.

21. A process for the production of a zircon based stain according to claim 1, wherein the plasma dissociated zircon sand is first mixed with a colour determining agent and a mineraliser and the mixture subsequently comminuted to a particle size of from 150 to 350 mesh (British Standard) and calcined.

22. The process according to claim 2 in which silica, in the amount of less than 15% by weight of said comminuted plasma dissociated zircon sand is added to the mixture of comminuted plasma dissociated zircon sand and color determining agent in step 3.

* * * * *